3,089,881
SULFOCARBOXYLIC ACID ESTERS OF HYDROXYLATED STEROIDS
Emanuel B. Hershberg, West Orange, and David H. Gould, Leonia, N.J., assignors to Schering Corporation, Bloomfield, N.J., a corporation of New Jersey
No Drawing. Filed Oct. 29, 1957, Ser. No. 693,046
27 Claims. (Cl. 260—397.45)

This invention relates to a new group of water soluble derivatives of sterols and to processes for their manufacture. More particularly, the compounds of our invention are sterol half esters of carboxylic-sulfonic diacids which form water soluble salts.

The new compounds of our invention may be represented by the following formula:

$$St—OCOR—SO_3H$$

wherein St is a therapeutically active sterol containing esterifiable hydroxyl groups, preferably in the 3, 16, 17, 20 or 21 position; R is a member of the group consisting of alkylene, cycloalkylene, and phenylene radicals containing from 1 to 10 carbon atoms; and the nontoxic salts thereof.

Representative sterols embraced by the designation "St" and having an esterifiable hydroxyl at $C_3$ are estrone, estradiol, ethinyl-estradiol, and the like; those with an esterifiable hydroxyl at $C_{16}$ are exemplified by 16α-hydroxy-prednisone, 16α-hydroxy-prednisolone, analogues and derivatives thereof; those with an esterifiable hydroxyl at $C_{17}$ are such as testosterone, 19-nor-testosterone, estradiol, and the like; and at $C_{21}$, compounds such as cortisone, hydrocortisone, prednisone, prednisolone, 9α-fluoroprednisone, 9α-fluoroprednisolone, 16-hydroxy-9α-fluoroprednisolone, desoxycorticosterone, corticosterone, and the 6-methyl analogues thereof.

We have found our compounds to be equally useful in the case of the cortical hormones, where sulfonic acid derivatives may be prepared for cortisone, hydrocortisone, prednisone, prednisolone, and the like; as well as in the case of androgenic hormones such as androstenolone, and testosterone, and in the case of such hormones as estrone, estradiol stilbestrol and the like.

Representative of the group —OCOR—SO₃H wherein R is alkylene are sulfonic acid derivatives of fatty acids such as sulfoacetic β-sulfopropionic, α-sulfo-n-butyric and the like; those wherein R is cycloalkylene are sulfonic acid derivatives of cycloalkanecarboxylic acids such as sulfocamphylic, 2-, 3-, and 4-sulfocyclohexanylcarboxylic, 2-sulfo-6-methylcyclohexanylcarboxylic, 3-sulfocyclohexanylacetic and the like; those wherein R is phenylene are sulfonic acid derivatives of aromatic acids, such as 2-, 3-, or 4-sulfobenzoic or 2-sulfo-6-methylbenzoic and the like.

The sterol half-esters of these carboxylic-sulfonic diacids easily form salts, typical of which are the ammonium salts, alkali metal salts such as potassium or sodium; alkaline earth metal salts such as calcium or barium; and organic base salts such as are formed with amines.

Because of the generally low solubility in water of steroidal hormones, compounding in the form of aqueous or oil suspensions usually is required for parenteral administration. In some instances, however, it is desirable and even necessary to have aqueous solutions as, for example, in intravenous, intra-articular and other modes of parenteral administration; as well as in eye drops, nasal sprays and lotions (in place of non-homogeneous suspensions); and in some types of ointments and oral medications.

Heretofore, a major objection to the latter types of preparations which used suspensions of steroidal hormones was that they were inefficiently absorbed, and a gritty sensation was experienced by the patient. By means of the soluble esters of our invention, solutions and homogeneous ointments may now be compounded, permitting more uniform compounding and more efficient absorption of the hormone.

Several previous attempts have been made to obtain water soluble derivatives of steroidal hormones. Sugar derivatives have been prepared, but are difficult to make and, moreover, such derivatives tend to hydrolyze in aqueous media. Half-esters of polycarboxylic acids possess a serious practical difficulty in that the salts are not neutral, and in solutions undergo self-catalyzed hydrolysis. Thus, these aqueous solutions are not stable for more than a few days at best.

The compounds of our invention, on the other hand, overcome this difficulty of stability. Since the free acid group is a "strong" acid, salts of these carboxylic estersulfonic acids with strong inorganic bases, such as sodium hydroxide, are completely neutral, and their aqueous solutions are stable indefinitely. The solutions may even be sterilized by autoclaving at 125° C. without causing decomposition. Under similar conditions, salts of half-esters such as a sodium hemisuccinate would decompose.

A further advantage of the sulfonic acid-carboxylic esters of our invention is that the ester linkage is always through the carboxyl group. Thus, one distinct compound is formed rather than a mixture such as results from an unsymmetrical dicarboxylic acid like α-methylsuccinic acid. A further advantage of our compounds being carboxylic esters is that they are readily hydrolyzed in vivo to the free active hormones.

The compounds of our invention may be prepared in an inert solvent by the interaction of a sterol containing an esterifiable hydroxyl group with either the free sulfonic-carboxylic diacid, the diacid-dichloride, or the diacid anhydride. When the reactant diacids are in the form of their anhydrides, we prefer to react same with the sterol in an inert solvent, such as dioxane, dimethylformamide, dimethylsulfoxide, or pyridine, methylene chloride, chloroform, benzene, etc. When in the form of the free diacid, the esterification is preferably accelerated by removing water, either physically, such as with a Dean-Stark apparatus; or chemically, such as by the use of trifluoroacetic anhydride in an inert solvent.

Alternatively the corresponding acid chlorides may be employed. The sulfocarboxylic acid is reacted with either thionyl chloride, phosphorous trichloride, phosphorous oxychloride, or the like, to give the diacid-dichloride. The diacid-dichloride thus formed is then reacted with the sterol in an inert solvent as mentioned above and preferably in the presence of a base. The chlorosulfonylcarboxylic ester thus formed may be easily hydrolyzed to the corresponding sterol half-ester wherein the free acid group is the sulfonic moiety.

The ester-acids are preferably stored and used as their salts. The salts are easily formed by neutralizing the acid derivatives with an equivalent amount of a base such as ammonium hydroxide, sodium or potassium hydroxide, calcium or barium hydroxide, pyridine, pyrrole, diethanolamine, and the like. These salts may be purified by precipitation from such solvents as aqueous acetone, aqueous acetonitrile, and the like.

The basic requirements for applicability and operability of our process is that the free sterol contain an esterifiable hydroxyl group, preferably in the 3, 16, 17, or 21-positions and preferably be therapeutically active per se. The presence of other functional groups in the molecule such as keto or unesterifiable hydroxyl does not affect the operability of our process.

The following examples are illustrative of the preparation of some of the compounds of our invention. Our invention, however, is limited only by the appended claims.

EXAMPLE 1

*Prednisolone 21-Sulfoacetate*

Sulfoacetic acid (10 g.) is dissolved in dioxane, and the solution evaporated to dryness. After repeating this process, 20 ml. of thionyl chloride is added to the residue and the solution is refluxed for 5 hours. After distilling the excess thionyl chloride at atmospheric pressure, the residue is distilled in vacuo to yield chlorosulfonylacetylchloride ($ClSO_2CH_2COCl$), B.P. 85–90° C./1 mm.

A sample of 0.52 g. of the bis-acid chloride prepared above is dissolved in 2 ml. of dry pyridine, and mixed with 1 g. of prednisolone in 5 ml. of pyridine. After standing at room temperature for 5 hours, the mixture is poured into 100 ml. of water. The solution is made slightly acidic with dilute hydrochloric acid (pH 6.5–7.0), filtered, then acidified to pH 2–3 with hydrochloric acid. After a period of two hours, the solution is extracted with methylene chloride. The extracts are dried over magnesium sulfate, filtered, then evaporated to dryness to yield crude prednisolone 21-sulfoacetate.

Potassium hydroxide (0.15 g.) in 5 ml. of water is added to the prednisolone 21-sulfoacetate. The solution is evaporated in an air stream and the solid residue crystallized from acetonitrile to yield the potassium salt of prednisolone 21-sulfoacetate.

EXAMPLE 2

*Prednisolone 21-Sulfocamphylate*

Sulfocamphylic acid is converted to the bis-acid chloride by adding excess thionyl chloride to a dioxane solution of the acid, and refluxing for five hours. The excess thionyl chloride is distilled, anhydrous ether added to the residue, and the insolubles filtered. The ether solution is evaporated to yield chlorosulfonylcamphylyl chloride.

To one gram of prednisolone in 5 ml. of dry pyridine is added 0.9 gram of the above prepared bis-acid chloride in 3 ml. of dry pyridine, and the mixture is reacted as described in Example 1 to yield prednisolone 21-sulfocamphylate.

The sodium salt is prepared by neutralizing the free acid-ester with sodium hydroxide (0.11 g.) and evaporating the solution to a semicrystalline residue. This is purified further by precipitation from aqueous acetone to yield the sodium salt of prednisolone 21-sulfocamphylate.

EXAMPLE 3

*Prednisolone 21-o-Sulfobenzoate*

To 20 g. of prednisolone dissolved in 200 ml. of dry pyridine is added 12.75 g. of o-sulfobenzoic anhydride. The mixture is stirred 16 hours at room temperature, then poured into 200 ml. of water. The solution is acidified with sulfuric acid, and a precipitate of the pyridinium salt of prednisolone 21-o-sulfobenzoate is obtained. This is filtered, dissolved in dilute sodium hydroxide, and reprecipitated with hydrochloric acid. The crystalline solid is the pyridinium salt of prednisolone 21-o-sulfobenzoate which is recrystallized from water, M.P. 217–219° C.

Fifteen grams of the prednisolone 21-o-sulfobenzoate is suspended in 400 ml. of 50% methanol. The pH is adjusted to 7.1 with dilute sodium hydroxide, and the solution evaporated in vacuo. The residue is crystallized from aqueous acetonitrile to give the sodium salt of prednisolone 21-o-sulfobenzoate, M.P. 280–281° C. (dec.) $[\alpha]_D+122$ (water).

The free acid-ester may be recovered from a solution of the above prepared sodium salt in water by acidification with sulfuric acid, followed by extraction with methylene chloride. The dried soultion upon evaporation yields prednisolone 21-o-sulfobenzoate.

By adding 237 mg. of potassium chloride to a solution of 100 mg. of the sodium salt prepared above, the potassium salt of prednisolone 21-o-sulfobenzoate is obtained as a crystalline solid, M.P. 297–298° C. (dec.).

The corresponding ammonium salt is prepared by dissolving a sample of the free acid-ester in an ammonium hydroxide solution. Evaporation of this solution in an air stream gives a solid residue which is the ammonium salt of prednisolone 21-o-sulfobenzoate.

The barium salt of prednisolone 21-o-sulfobenzoate is prepared by neutralization of the free acid-ester with an aqueous suspension of one equivalent of barium hydroxide. After evaporation of the aqueous solution in an air stream, there remains a solid residue of the barium salt of prednisolone 21-o-sulfobenzoate. The calcium salt is prepared in the same manner.

EXAMPLE 4

*Prednisolone 21-p-Sulfobenzoate* p-Sulfobenzoic acid, freshly prepared from its barium salt by treatment with sulfuric acid and evaporation of the filtered solution, is dissolved in pyridine and treated with 4.2 equivalents of trifluoroacetic anhydride. The reaction is warmed on a steam bath for one hour, cooled to room temperature, and an aliquot corresponding to 0.65 g. of p-sulfobenzoic acid is added to a solution of 1 g. of prednisolone in 10 ml. of pyridine. After standing 18 hours, the reaction mixture is poured into 100 ml. of water and acidified with dilute sulfuric acid. After warming at 60° C. for ½ hour, the mixture is extracted with chloroform, and the combined extracts evaporated to dryness. The solid residue is prednisolone 21-p-sulfobenzoate.

The free acid-ester obtained above is then covered with water and titrated to pH 7.1 with dilute sodium hydroxide. The solution is evaporated and the residue crystallized from aqueous acetonitrile to give the sodium salt of prednisolone 21-p-sulfobenzoate.

EXAMPLE 5

*Prednisolone 21-m-Sulfobenzoate* m-Chlorosulfonylbenzoyl chloride (0.65 g.) is dissolved in 10 ml. of anhydrous ether and added to a solution of 1 g. of prednisolone in 10 ml. of pyridine. The reaction mixture is warmed to 60° C., while distilling the ether over a period of two hours, then is cooled and poured into water. Upon evaporation, this aqueous mixture yields the crude pyridine salt (along with pyridine hydrochloride). The mixed salt is crystallized from aqueous acetone, then dissolved in water and titrated with dilute sodium hydroxide to pH 7.1. Evaporation of this solution to dryness, and crystallization of the residue from aqueous acetonitrile yields the sodium salt of prednisolone 21-m-sulfobenzoate.

The free acid, prednisolone 21-m-sulfobenzoic acid is liberated when treated with sulfuric acid as described in Example 3.

EXAMPLE 6

*Prednisolone 21-(α-Sulfo-n-Butyrate)*

α-Sulfo-n-butyric acid (0.5 g.) is dissolved in dioxane and the solution distilled to dryness. To the residue is added 0.95 ml. of trifluoroacetic anhydride in 5 ml. of tetrahydrofuran and the mixture is refluxed 30 minutes then cooled to room temperature. A solution of 1 g. of prednisolone in 10 ml. of tetrahydrofuran is added and the reaction mixture warmed to 40° C. and kept at this temperature for 1 hour. The solution is diluted with 10 ml. of water and evaporated to dryness yielding crude prednisolone 21-(α-sulfo-n-butyrate). The acid-ester is purified by preparing the sodium salt as described in Example 4.

EXAMPLE 7

*Hydrocortisone 21-o-Sulfobenzoate*

Hydrocortisone (1 g.) is dissolved in 10 ml. of pyridine and treated with 0.6 g. of o-sulfobenzoic anhydride as described in Example 3 to obtain hydrocortisone 21-m-sulfobenzoate.

The sodium salt of this acid-ester is prepared in the manner described in Example 4, and is crystallized from aqueous acetonitrile to give sodium hydrocortisone 21-o-sulfobenzoate.

EXAMPLE 8

*Prednisone 21-o-Sulfobenzoate*

Prednisone (1 g.) is treated with 0.6 g. of o-sulfobenzoic anhydride as described in Example 3. Mild acidification of the reaction mixture gives the pyridinium salt of prednisone 21-o-sulfobenzoate which is crystallized from water.

The pyridium salt is converted to the sodium salt as described in Example 3. Crystallization from aqueous acetonitrile yields sodium prednisone 21-o-sulfobenzoate.

EXAMPLE 9

*Prednisone 21-m-Sulfobenzoate*

Prednisone (1 g.) is treated with 0.65 g. of m-chlorosulfonylbenzoyl chloride as described in Example 5. The crude pyridinium salt of prenidsone 21-m-sulfobenzoate is converted to the sodium salt and crystallized from aqueous acetonitrile to yield sodium prednisone 21-m-sulfobenzoate.

EXAMPLE 10

*Prednisone 21-p-Sulfobenzoate* p-Sulfobenzoic acid (0.70 g.) is converted to the bis-acid chloride as described in Example 2, which is reacted with one gram of prednisone in 10 ml. of pyridine as described in Example 1. The resulting prednisone 21-p-sulfobenzoate is isolated as the sodium salt which is crystallized from acetonitrile.

EXAMPLE 11

*Prednisone 21-Sulfoacetate*

Prednisone (1 g.) is treated with 0.55 g. of chlorosulfonylacetyl chloride as described in Example 1. The acid-ester is converted to the sodium salt as described in Example 2 which is crystallized from aqueous acetonitrile to yield sodium prednisone 21-sulfoacetate.

EXAMPLE 12

*Cortisone 21-o-Sulfobenzoate*

Cortisone (1 g.) is treated with 0.63 g. of o-sulfobenzoic anhydride as described in Example 3. The sodium salt of the acid-ester is purified by crystallization from aqueous acetonitrile to yield sodium cortisone 21-o-sulfobenzoate.

EXAMPLE 13

*9α-Fluoroprednisone 21-o-Sulfobenzoate*

9α-fluoroprednisone is reacted with o-sulfobenzoic anhydride as described in Example 8 to obtain the pyridinium salt of 9α-fluoroprednisone 21-o-sulfobenzoate.

The pyridinium salt is converted to the sodium salt as described in Example 3. Crystallization from aqueous acetonitrile yields sodium 9α-fluoroprednisone 21-o-sulfobenzoate.

EXAMPLE 14

*9α-Fluorohydrocortisone 21-o-Sulfobenzoate*

9α-fluorohydrocortisone is reacted with o-sulfobenzoic anhydride and pyridine as described in Example 7 to obtain 9α-fluorohydrocortisone 21-o-sulfobenzoate.

The sodium salt of this acid-ester is prepared in the manner described in Example 4, and is crystallized from aqueous acetonitrile to give sodium 9α-fluorohydrocortisone 21-o-sulfobenzoate.

We claim:

1. Steroids of the group consisting of $\Delta^4$-pregnenes and $\Delta^{1,4}$-pregnadienes the formulae:

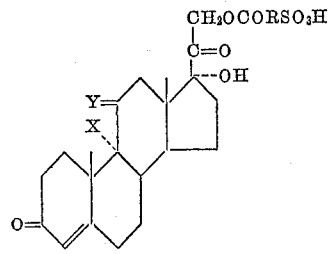

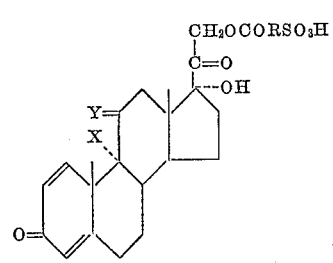

wherein X is a member of the group consisting of H, and F; Y is a member of the group consisting of O, and (H, OH); and R is a member of the group consisting of lower alkylene having up to 10 carbon atoms, cycloalkylene having 5 to 6 cyclic carbon atoms, and phenylene; and the nontoxic alkali metal, alkylene earth metal and amine salts thereof.

2. Compounds of the formula:

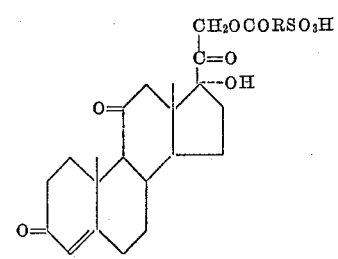

wherein R is a lower alkylene group having up to 10 carbon atoms.

3. Compounds of the formula:

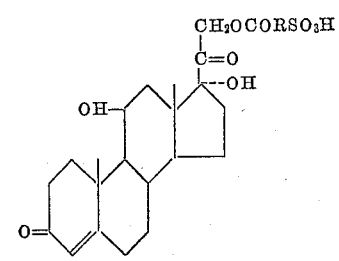

wherein R is a lower alkylene group having up to 10 carbon atoms.

4. Compounds of the formula:

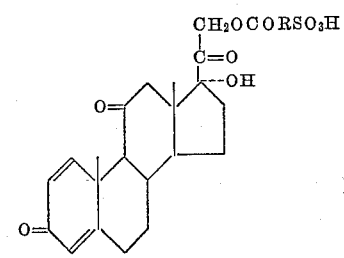

wherein R is a lower alkylene group having up to 10 carbon atoms.

5. Compounds of the formula:

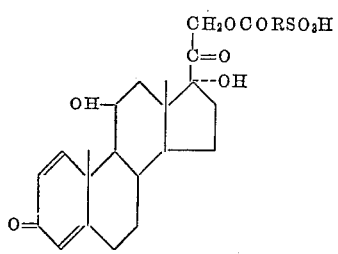

wherein R is a lower alkylene group having up to 10 carbon atoms.

6. Compounds of the formula:

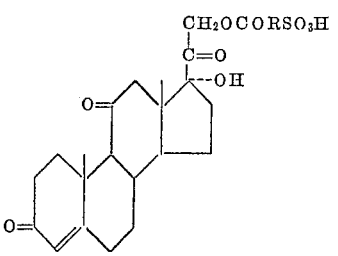

wherein R is a cycloalkylene group having 5 to 6 cyclic carbon atoms.

7. Compounds of the formula:

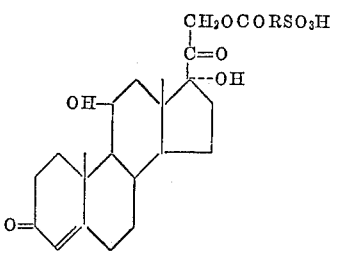

wherein R is a cycloalkylene group having 5 to 6 cyclic carbon atoms.

8. Compounds of the formula:

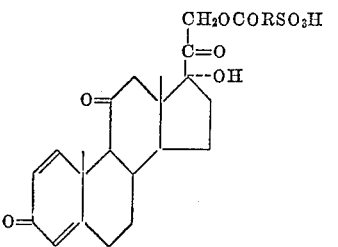

wherein R is a cycloalkylene group, having 5 to 6 cyclic carbon atoms.

9. Compounds of the formula:

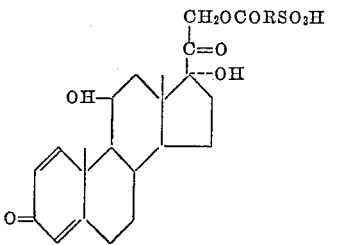

wherein R is a cycloalkylene group, having 5 to 6 cyclic carbon atoms.

10. Compounds of the formula:

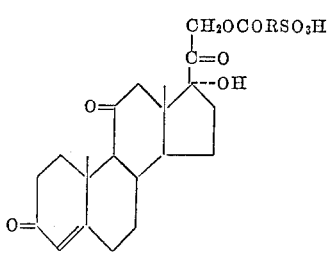

wherein R is phenylene.

11. Compounds of the formula:

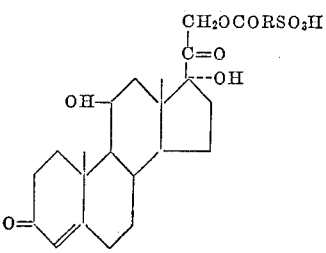

wherein R is phenylene.

12. Compounds of the formula:

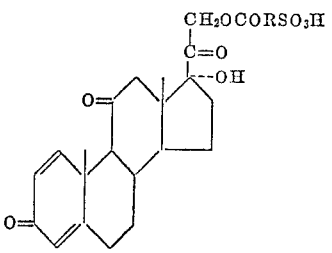

wherein R is phenylene.

13. Compounds of the formula:

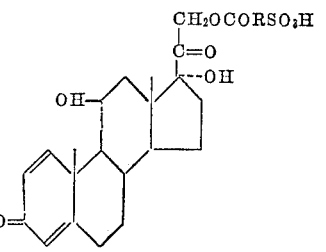

wherein R is phenylene.

14. Prednisolone 21-sulfoacetate.
15. Prednisolone 21-sulfocamphylate.
16. Prednisolone 21-o-sulfobenzoate.
17. Prednisolone 21-p-sulfobenzoate.
18. Prednisolone 21-m-sulfobenzoate.
19. Prednisolone 21-(α-sulfo-n-butyrate).
20. Hydrocortisone 21-o-sulfobenzoate.
21. Prednisone 21-o-sulfobenzoate.
22. Prednisone 21-m-sulfobenzoate.
23. Prednisone 21-p-sulfobenzoate.
24. Prednisone 21-sulfoacetate.
25. Cortisone 21-o-sulfobenzoate.
26. An alkali metal salt of the 21-o-sulfobenzoate of a $\Delta^1$-dehydrocorticosteroid compound of the formula:

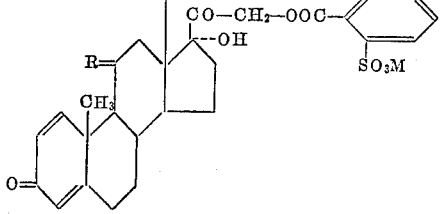

wherein R represents a member selected from the group consisting of a secondary alcohol group and a keto group, and M represents an alkali metal.

27. 21-esters of a physiologically active 3,20-diketo-17α,21-dihydroxy compounds of the pregnane series having a configuration about the 21-position represented by the formula:

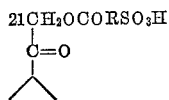

wherein R is a member of the group consisting of lower alkylene having up to 10 carbon atoms, cycloalkylene having 5–6 cyclic carbon atoms and phenylene; and the non-toxic alkali metal, alkaline earth metal and amine salts thereof.

References Cited in the file of this patent
UNITED STATES PATENTS

| | | |
|---|---|---|
| 2,183,589 | Reichstein et al. | Dec. 19, 1939 |
| 2,225,662 | Schwenk et al. | Dec. 24, 1940 |